(12) United States Patent
Schachter

(10) Patent No.: US 10,842,283 B2
(45) Date of Patent: Nov. 24, 2020

(54) FOLDABLE HEADBOARD

(71) Applicant: The FHE Group Inc., Concord (CA)

(72) Inventor: Adam Schachter, Concord (CA)

(73) Assignee: The FHE Group Inc., Concord (CA)

(*) Notice: Subject to any disclaimer, the term of this patent is extended or adjusted under 35 U.S.C. 154(b) by 176 days.

(21) Appl. No.: 16/210,100

(22) Filed: Dec. 5, 2018

(65) Prior Publication Data

US 2020/0037772 A1 Feb. 6, 2020

(30) Foreign Application Priority Data

Aug. 3, 2018 (CA) ...................................... 3013379

(51) Int. Cl.
*A47C 19/02* (2006.01)
*A61G 7/05* (2006.01)

(52) U.S. Cl.
CPC .......... *A47C 19/022* (2013.01); *A47C 19/021* (2013.01); *A61G 7/0506* (2013.01)

(58) Field of Classification Search
CPC ..... A47C 19/005; A47C 19/02; A47C 19/021; A47C 19/022; A47C 19/22; A47C 27/001; A47C 7/383; A61G 7/05; A61G 7/0506; A47G 9/062; A47G 9/10
USPC ........................... 5/53.1, 53.2, 640, 420, 722
See application file for complete search history.

(56) References Cited

U.S. PATENT DOCUMENTS

| | | | | |
|---|---|---|---|---|
| 1,537,414 A | * | 5/1925 | Darling ................. | A61G 13/12 5/722 |
| 1,737,604 A | * | 12/1929 | Martin ................. | A47C 17/134 5/21 |
| 2,013,481 A | * | 9/1935 | Stonehill ................ | A47C 7/383 5/640 |
| 2,508,506 A | * | 5/1950 | Fridolph .............. | A47C 19/022 160/378 |
| 2,641,779 A | * | 6/1953 | Gill ...................... | A47C 19/022 5/53.1 |
| 2,687,537 A | * | 8/1954 | Wallace et al. ...... | A47C 19/022 5/280 |
| 2,784,419 A | * | 3/1957 | McLean ............... | A47C 17/136 5/18.1 |
| 3,736,603 A | * | 6/1973 | Rothman ................. | A47D 7/00 5/53.1 |
| 4,194,254 A | * | 3/1980 | Torrez ...................... | A47C 3/16 297/452.16 |
| 4,679,263 A | * | 7/1987 | Honer .................... | A47C 7/383 297/393 |
| 4,821,349 A | | 4/1989 | Cohen | |
| 5,075,910 A | | 12/1991 | Morten | |
| 5,195,195 A | * | 3/1993 | Murray ................ | A47C 19/022 5/406 |
| 5,269,032 A | | 12/1993 | Flocks | |

(Continued)

*Primary Examiner* — Robert G Santos
(74) *Attorney, Agent, or Firm* — Bond Schoeneck & King, PLLC; George McGuire

(57) ABSTRACT

A multi-piece foldable headboard has a foldable multi-piece body member made using a plurality of panels that can be expanded when in use or collapsed for shipping and storage. A latch is provided to lock the body member in the fully expanded position, and posts are attachable for connection to a bed frame. The front surface of the body member is overlaid with a sheet of flexible material that functions as a hinge between the panels to give the headboard the look of a solid one-piece headboard when in the fully expanded, unfolded state.

22 Claims, 11 Drawing Sheets

(56) References Cited

U.S. PATENT DOCUMENTS

| | | | | | |
|---|---|---|---|---|---|
| 5,572,757 | A | * | 11/1996 | O'Sullivan | A47C 7/46 297/284.5 |
| 5,669,093 | A | * | 9/1997 | Ogle et al. | B68G 9/00 5/655.8 |
| 6,182,307 | B1 | * | 2/2001 | Rutrick | A47C 19/022 5/280 |
| 6,578,218 | B2 | * | 6/2003 | Wassilefsky | A47C 20/021 5/630 |
| 6,711,766 | B2 | * | 3/2004 | Monk | A47B 95/02 5/417 |
| 7,681,259 | B2 | * | 3/2010 | Jin | A47C 19/022 5/53.1 |
| 8,850,638 | B1 | * | 10/2014 | Suh | A47C 19/005 5/201 |
| 9,526,328 | B2 | * | 12/2016 | Illulian | A47B 3/083 |
| D871,123 | S | * | 12/2019 | Schachter | D6/718.23 |
| 2002/0088057 | A1 | * | 7/2002 | Wassilefsky | A61G 7/0755 5/648 |
| 2003/0221256 | A1 | * | 12/2003 | Monk | F41H 5/0478 5/420 |
| 2008/0028529 | A1 | * | 2/2008 | Abell | A47G 9/0253 5/640 |
| 2009/0288253 | A1 | * | 11/2009 | Jin | A47C 19/022 5/282.1 |
| 2016/0206088 | A1 | * | 7/2016 | Illulian | A47C 19/005 |
| 2020/0037772 | A1 | * | 2/2020 | Schachter | A47C 19/022 |

* cited by examiner

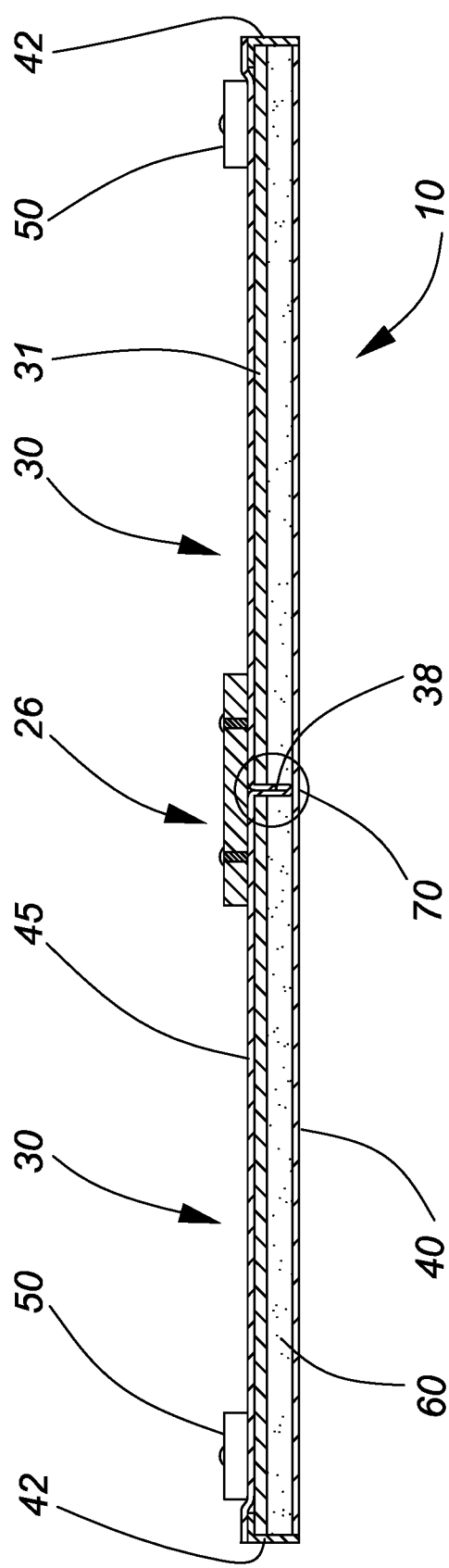
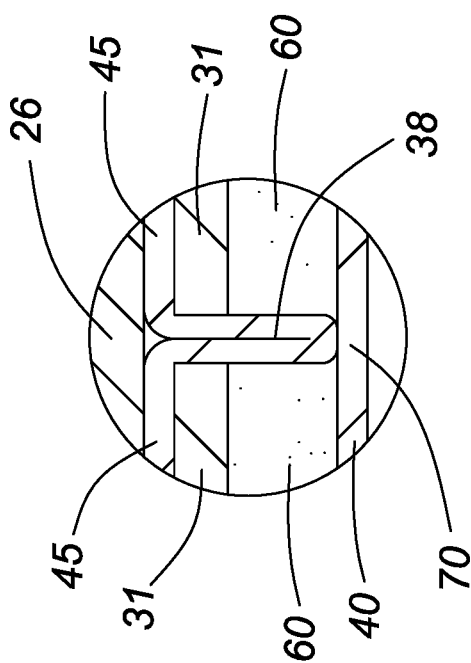

FOLDABLE HEADBOARD

CROSS-REFERENCE TO RELATED APPLICATION

The present application relates and claims priority to Canadian Application No. 3013379, filed on Aug. 3, 2018, the entirety of which is hereby incorporated by reference.

FIELD

The present disclosure relates to a multi-piece foldable headboard and a method of making a multi-piece foldable headboard, which has the appearance of a solid one-piece headboard when in an expanded, open or unfolded state.

BACKGROUND

A headboard that is designed to be foldable between an expanded or open state and collapsed or closed state makes it easier and less expensive to package and ship. This lowers the cost to the consumer. Retail storage space is reduced, which is a benefit to the retailer, and helps lower cost. Consumers appreciate the convenience of being able to pick up the headboard by hand and carry it out of the store without assistance. Foldable headboards can be easily fit into a motor vehicle or secured to a roof rack for transport to the consumer's residence. In the home, a foldable headboard is easy to fit through doorways and into a bedroom without assistance or the risk of damaging walls or other furniture. Finally, a foldable headboard can be easily stored in the home when not in use.

However, one of the drawbacks of a foldable headboard can be its appearance. If it looks like a foldable headboard, with seams or creases in the front panel, it is less desirable to the consumer. Consumers want a solid, one-piece headboard that has a luxurious appearance. Seams and creases detract from the aesthetic impression provided by the headboard.

Therefore, there is a need for a foldable headboard that has all the benefits of foldability, while at the same time providing a luxurious, aesthetic appearance when in the fully expanded or open state, with no visible seams or creases created by the folding feature.

SUMMARY

In accordance with one aspect, there is provided a foldable headboard for connection to a bed frame comprising: a body member comprising a plurality of panels, each panel having a front surface and a rear surface; a sheet of a soft flexible material connected to the body member and overlaying the front surfaces of the panels, the soft flexible material forming a connecting hinge between adjacent panels permitting the body member to be folded between a fully open position where the front surfaces of the panels are co-planer and a fully closed position where the front surfaces of the adjacent panels are in parallel opposition; a latching mechanism attachable to rear surfaces of the panels for locking the body member in the fully open position; and posts attachable to the body member, the posts configured for securing the body member to the bed frame.

In accordance with another aspect, there is provided a foldable headboard for connection to a bed frame comprising: a body member being foldable between a fully open position and a fully closed position, the body member comprising a plurality of panels, each panel having opposed front and rear surfaces and an edge surface connecting the front and rear surfaces the panel, wherein at least a portion the edge surface of each panel is positioned adjacent and abutting a portion of the edge surface of at least one of an adjacent one of the plurality of panels when the body member is in the fully open position; a top sheet of a soft flexible material having a size and shape equal to a combined size and shape of the front surfaces of the plurality of panels when the body member is in the fully open position, the top sheet overlaying the front surfaces of the plurality of panels and being affixed to the body member thereby forming a soft flexible connecting member at a boundary between the adjacent and abutting edge surfaces of the panels, the soft flexible connecting member forming a connecting hinge permitting the body member to be folded at the boundary between the fully open position and the fully closed position wherein the front surfaces of the adjacent ones of the plurality of panels are in parallel opposition; a latching mechanism attachable to the rear surfaces of the panels for locking the body member in the fully open position; and posts attachable to the body member, the posts configured for securing the body member to the bed frame.

In accordance with a further aspect, there is provided a method of making a foldable headboard for attachment to a bed frame, the method comprising: assembling a body member in a fully open position, the body member comprising a plurality of panels, each panel having a front surface and a rear surface; overlaying the front surfaces of the panels with a top sheet of a soft flexible material; attaching the top sheet to the body member so that the soft flexible material forms a connecting hinge between adjacent ones of the plurality of panels thereby permitting the body member to be folded between the fully open position where the front surfaces of the plurality of panels are co-planer and a fully closed position where the front surfaces of the adjacent ones of the plurality of panels are in parallel opposition; providing a latching mechanism for attachment to the rear surfaces of the panels for locking the body member in the fully open position; and providing posts for attachment to the body member, the posts configured for securing the body member to the bed frame.

BRIEF DESCRIPTION OF THE DRAWINGS

Further features of the foldable headboard disclosed herein will become apparent from the following written description and the accompanying figures, in which:

FIG. 7 is a top view of the foldable headboard shown in FIG. 1;

FIG. 7A is an enlarge section of the panel boundary showing the flexible connecting member between the panels;

DETAILED DESCRIPTION

Figure 1:
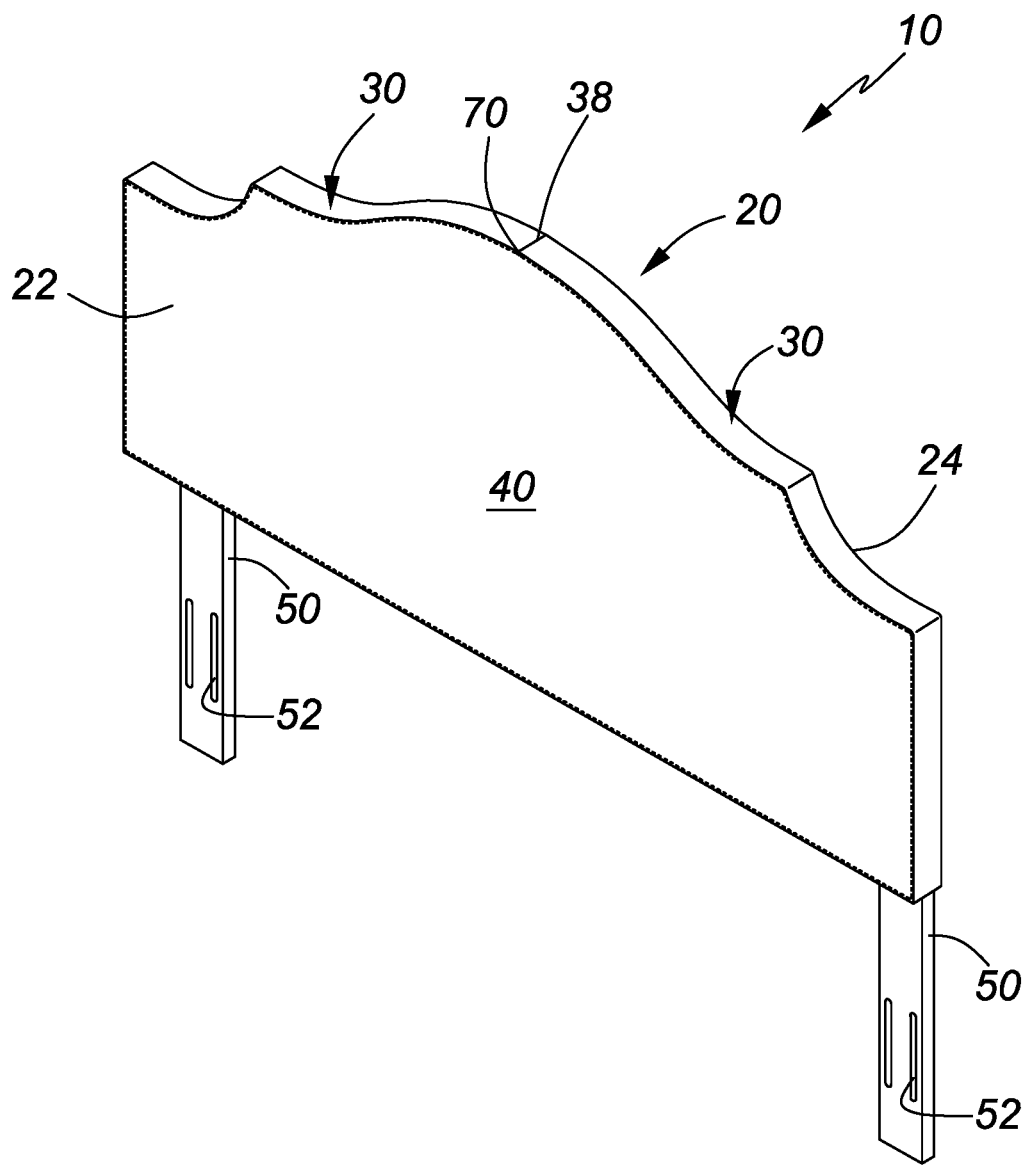
FIG. 1 is a front view of one embodiment of the foldable headboard in a fully open, expanded position ready for attachment to a bed frame.
Figure 2:
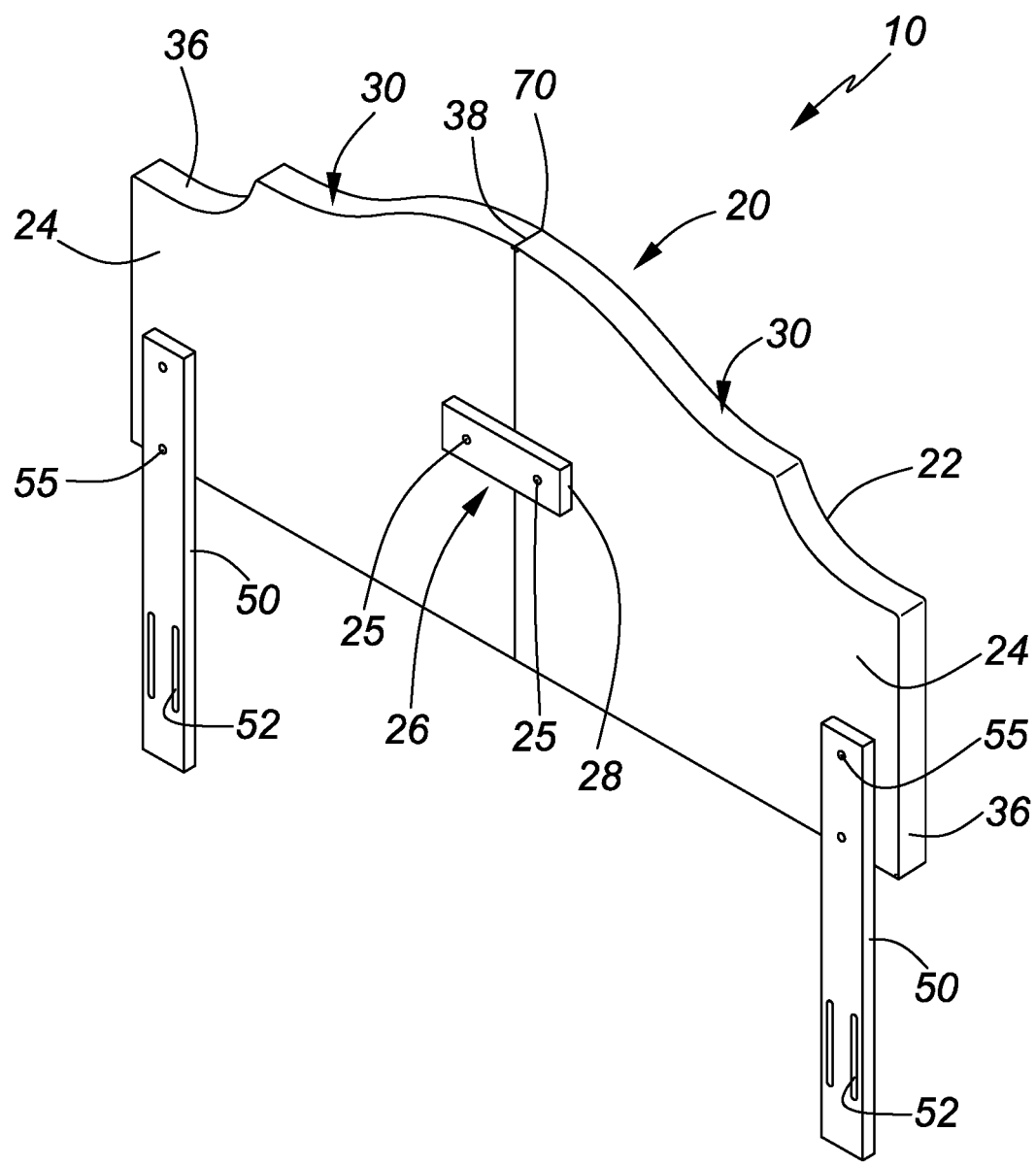
FIG. 2 is a rear view of the foldable headboard shown in FIG. 1.

The drawings, FIGS. 1 to 7, illustrate a multi-piece foldable headboard 10, including a foldable body member 20, a top sheet 40 of soft flexible material overlaying a front surface 22 of the body member 20, and headboard posts or stiles 50 removably attached to a rear surface 24 of the body member 20 for attachment of the foldable headboard 10 to a bed frame (not shown).

Figure 3:
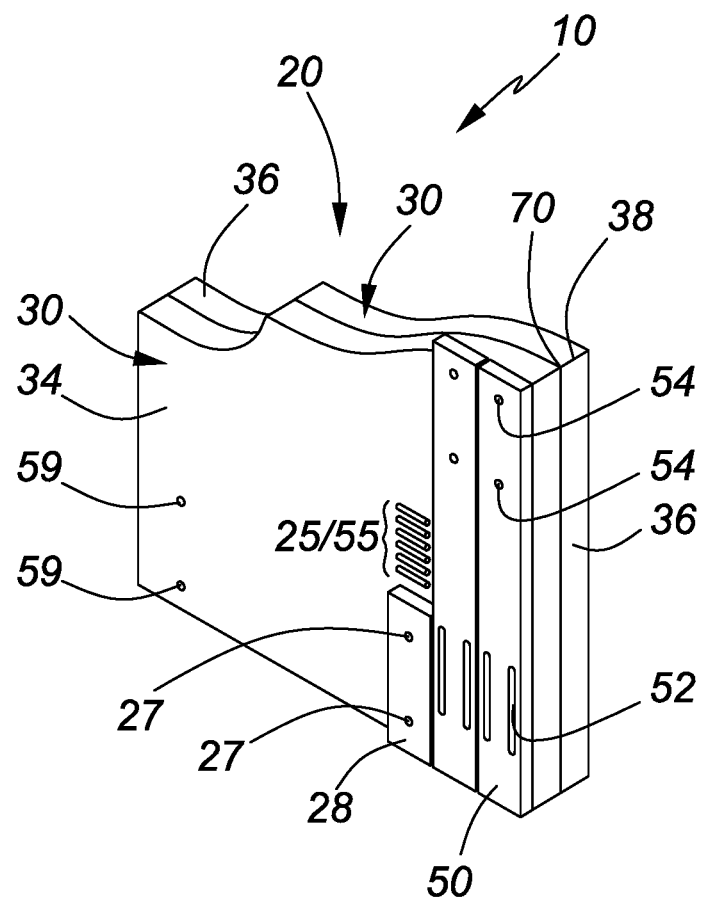
FIG. 3 shows the foldable headboard of FIG. 1 in fully closed position suitable for shipping or storage.
Figure 4:
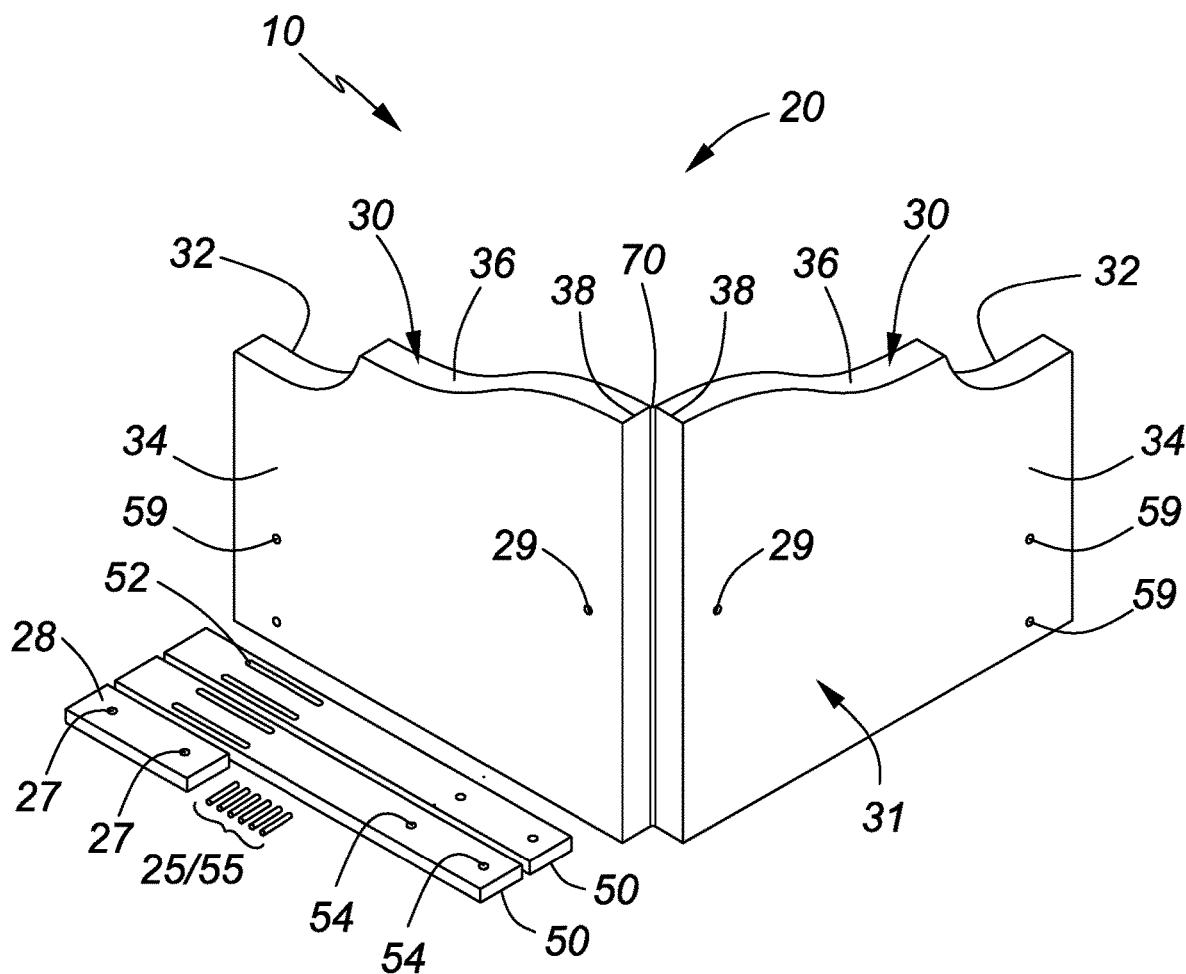
FIG. 4 shows the foldable headboard of FIG. 1 with the body member in a partially unfolded state.

The foldable body member 20 includes a plurality of interconnected panels 30 that can be folded to convert body member 20 between a fully open or expanded position, as shown in FIGS. 1, 2, 5, 6 and 7, and a fully closed or collapsed position, as shown in FIG. 3. FIG. 4 shows the foldable body member 20 in a partially folded position.

One or more latching mechanisms 26 are attachable to the rear surface 24 of body member 20 for use in locking the panels 30 in the fully open position. As shown in FIGS. 2 to 7, latching mechanism 26 consists of a latch piece 28 that may be affixed to panels 30 using threaded bolts 25 that fit through holes 27 in latch piece 28 and engage with threaded inserts 29 in panels 30. Those skilled in the art will understand that various other types of latching mechanisms are possible for the purpose of locking the panels 30 in the fully open position, including gravity latches, spring loaded latches, bolt latches, lever latches, drop bar latches, and magnetic latches.

Figure 8:
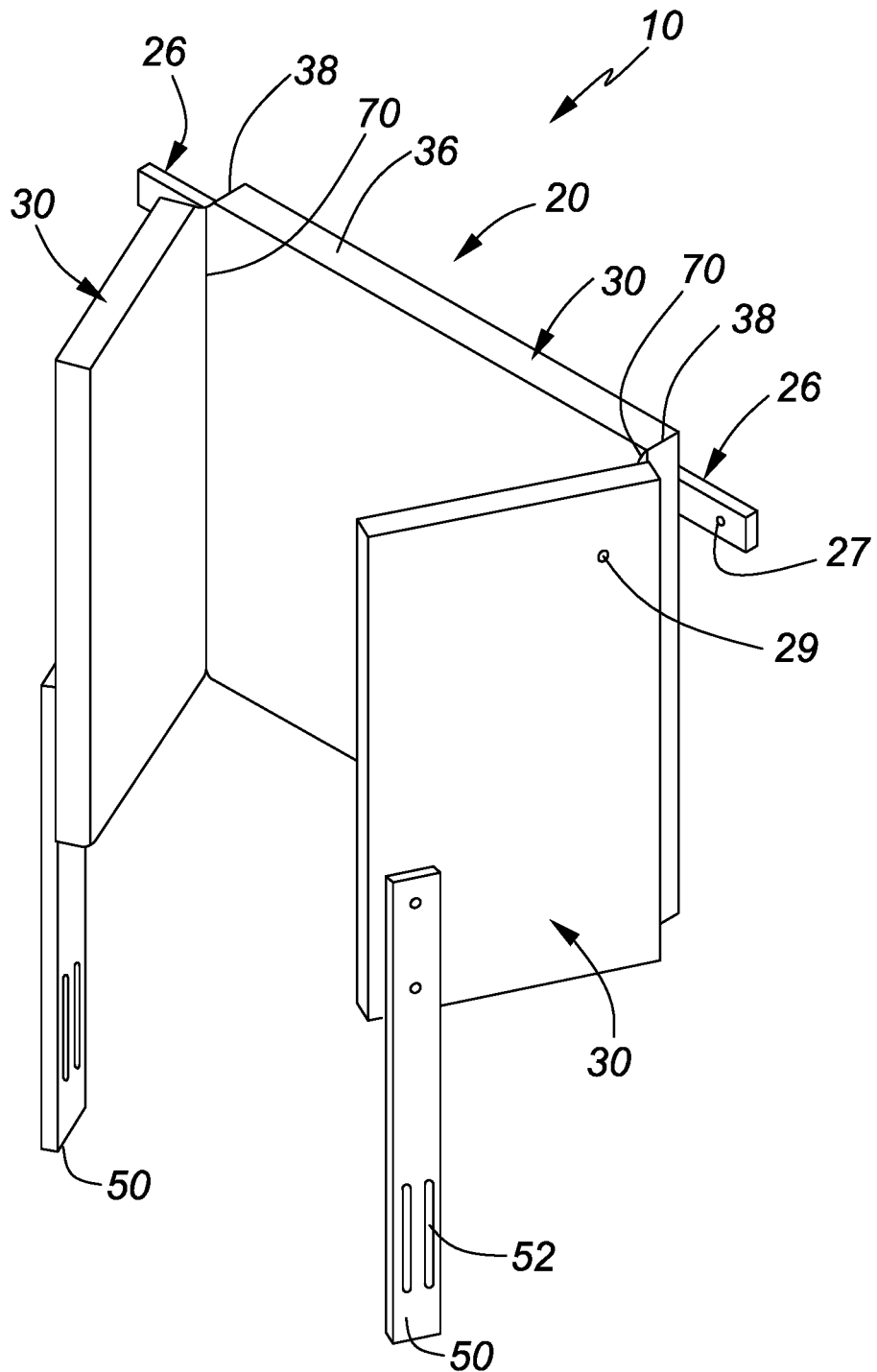
FIG. 8 is a front view of another embodiment of the foldable headboard having three panels and shown in a partially open state.

FIGS. 1 to 7 show a foldable body member 20 having two panels 30, however, one skilled in the art will appreciate that the foldable body member 20 may be constructed using more than two panels 30. For example, FIG. 8 shows the foldable headboard 10 having a foldable body member 20 with three panels 30. When body member 20 has more than two panels 30, additional locking mechanisms 26 will be required between the panels 30, as shown in FIG. 8.

Vertical posts or stiles 50 include one or more holes 54 near a first end for attachment of posts 50 to the rear surface 24 of body member 20 using threaded bolts 55 that fit through holes 54 and engage with threaded inserts 59 in panels 30. One or more slots 52 may be provided near a second end of posts 50 for adjustable attachment of the foldable headboard 10 to a bed frame.

Figure 5:
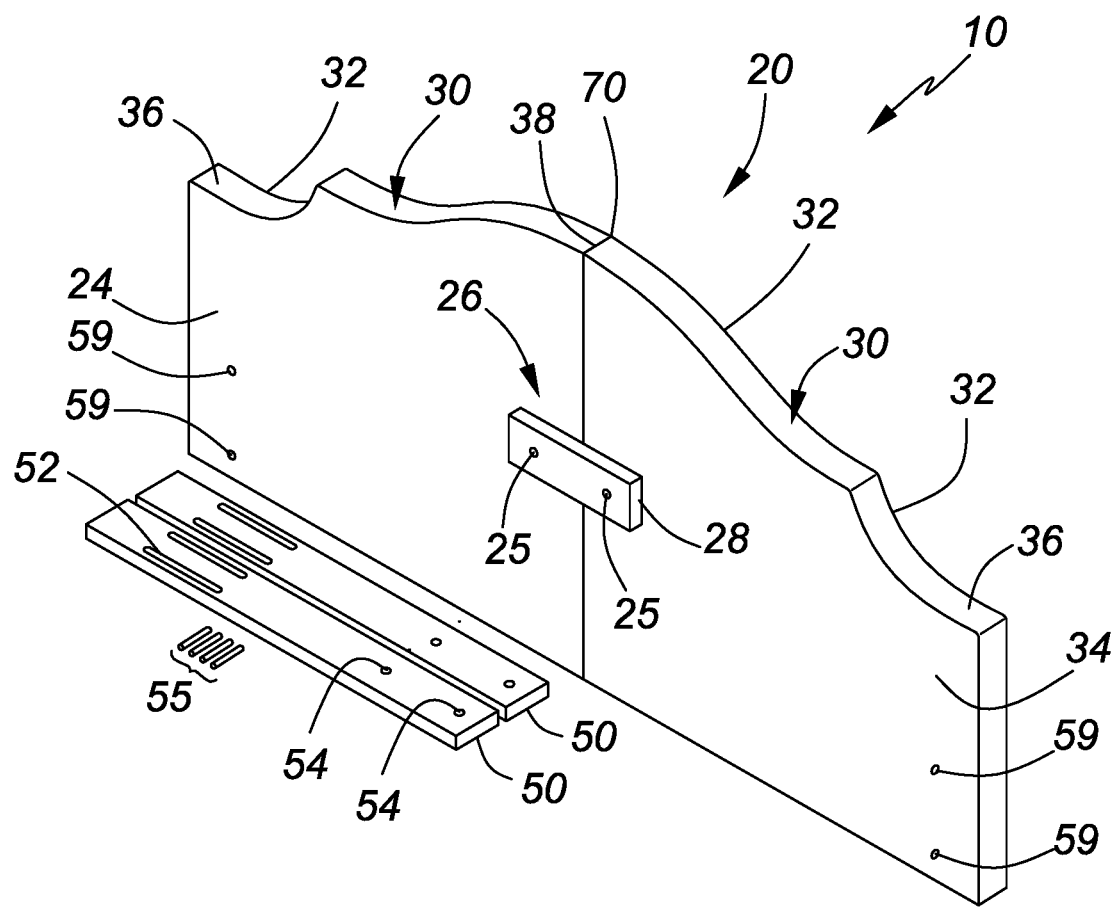
FIG. 5 shows the foldable headboard of FIG. 1 with the body member in the fully open and locked position.
Figure 6:
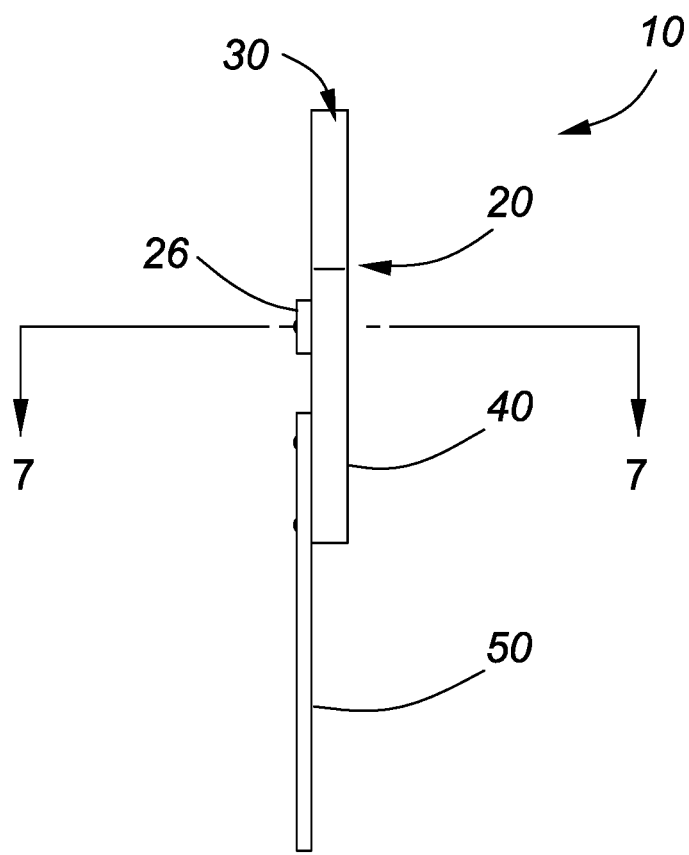
FIG. 6 is a right-side view of the foldable headboard shown in FIG. 1.

Referring to FIGS. 3 to 5, each panel 30 has opposed front 32 and rear 34 panel surfaces, and a continuous edge surface 36 connecting the front 32 and rear 34 panel surfaces. The edge surface 36 may vary in thickness as desired, depending on the materials used to construct the panels and whether padding is added. When the panels 30 are arranged in the fully open position, as shown in FIGS. 1, 2, 5 and 7, a portion of the edge surface 36 of each panel 30 is positioned adjacent and opposing at least a portion of the edge surface 36 of at least one neighbouring panel 30, thereby forming a panel boundary 38.

Figure 9:
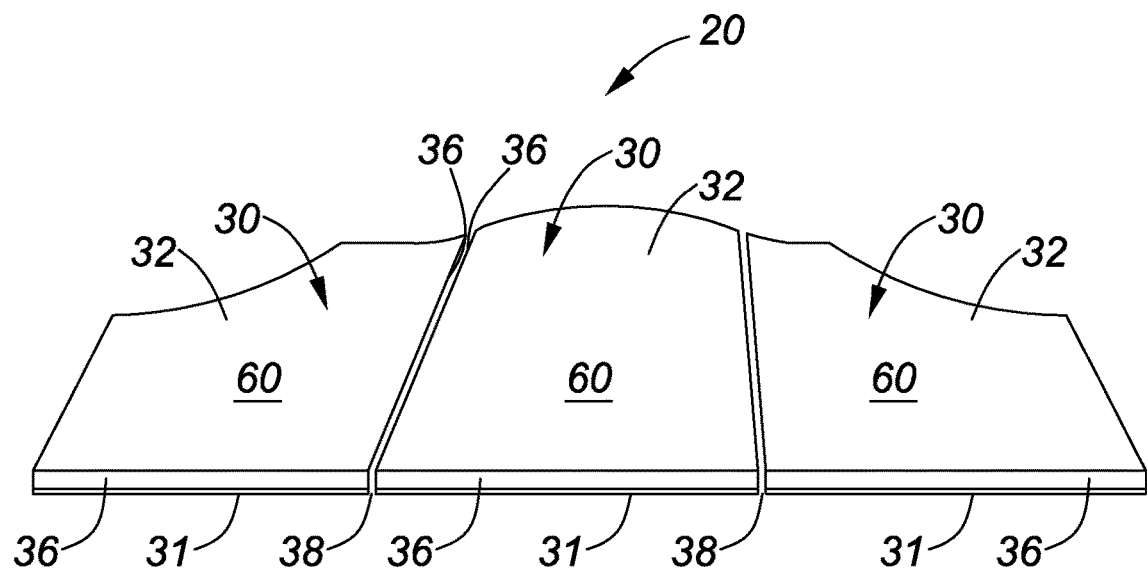
FIG. 9 shows the rigid back sheets of the panels of the body member of another embodiment of the foldable headboard having three different shaped panels, with padding attached to the back sheets.

As shown in FIG. 9, the panels 30 are constructed by first cutting a rigid back sheet 31 to the desired shape. The rigid back sheet 31 is generally made from medium-density fiberboard (MDF), but can be made from any rigid or semi-rigid sheet material such as, but not limited to cardboard, wood, plastic, composite and any other rigid materials known in the art. Holes are drilled and threaded inserts 29, 59 are fixed into the holes for attachment of latch mechanisms 26 and posts 50 (see FIGS. 2 to 5). One or more layers of resilient padding 60 may be added to the rigid back sheets 31. Suitable materials for the resilient padding include but are not limited to compressible solid foam and compressible batting made from natural or synthetic fibers. The resilient padding 60 is cut to the exact shape of the rigid back sheet 31 and affixed to the back sheet 31, generally with an adhesive, to create the desired thickness.

As shown in FIG. 9, during assembly, the panels 30 are arranged together on a flat surface in the exact configuration of the foldable body member 20 in its fully open position, with the opposed portions of the edge surfaces 36 of neighbouring panels 30 being adjacent and abutting one another at the panel boundary 38.

Figure 10:
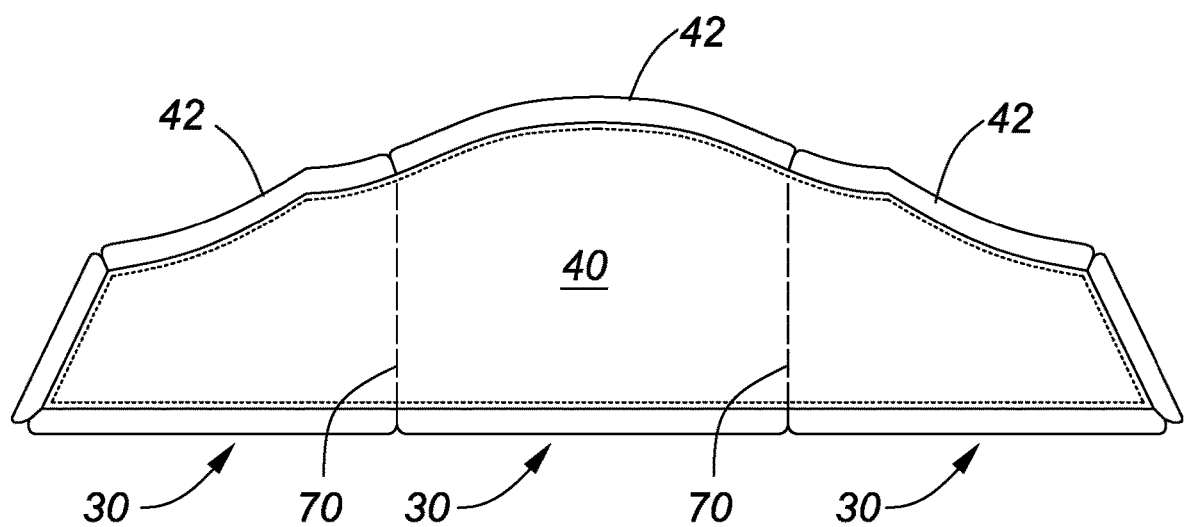
FIG. 10 shows the top sheet of soft flexible material for overlaying the front surface of the foldable body member shown in FIG. 9.

As shown in FIG. 10, the top sheet 40 is a sheet of soft flexible material that is cut to the exact size and shape of the entire, combined front surfaces 32 of the panels 30. Top sheet 40 overlays the front surfaces 32 of the panels 30 when the panels are assembled together as shown in FIG. 9, thereby forming a soft flexible connecting member or hinge 70 (see FIG. 7A) at the panel boundary 38 between the opposed adjacent panels 30, the soft flexible connecting member or hinge 70 permitting the body member 20 to be folded at the panel boundaries 38 between the fully open position, shown in FIG. 5, and the fully closed position, shown in FIG. 3. In the fully closed position, the front surfaces 32 of opposed adjacent panels 30 are in parallel opposition.

Figure 11:
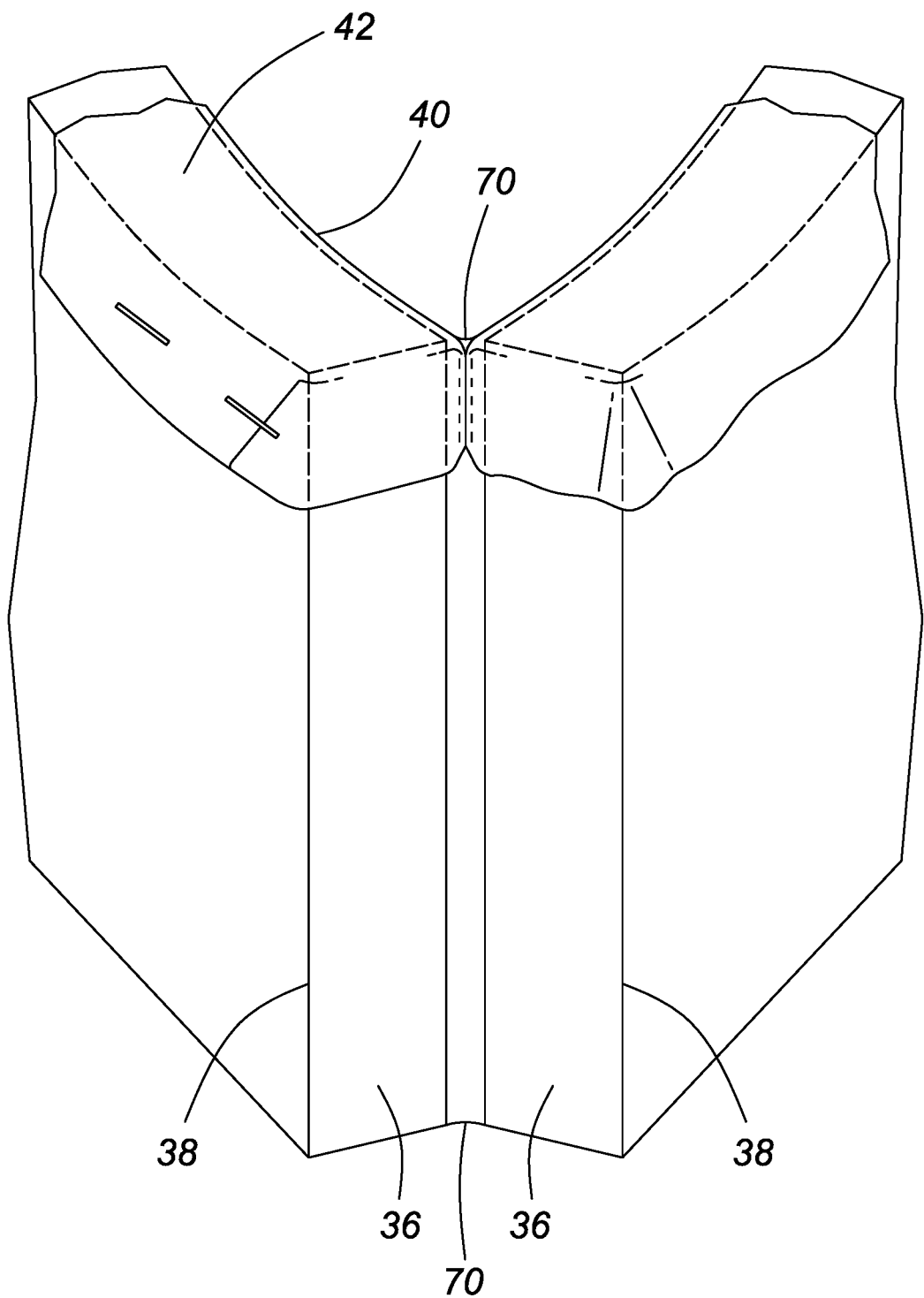
FIG. 11 is an isolated view of a fold zone at the boundary between two panels showing the flexible connecting member between the panels of the foldable body member, and also showing the edge strips used to connect the top sheet to the rigid back sheets.
Figure 11A:
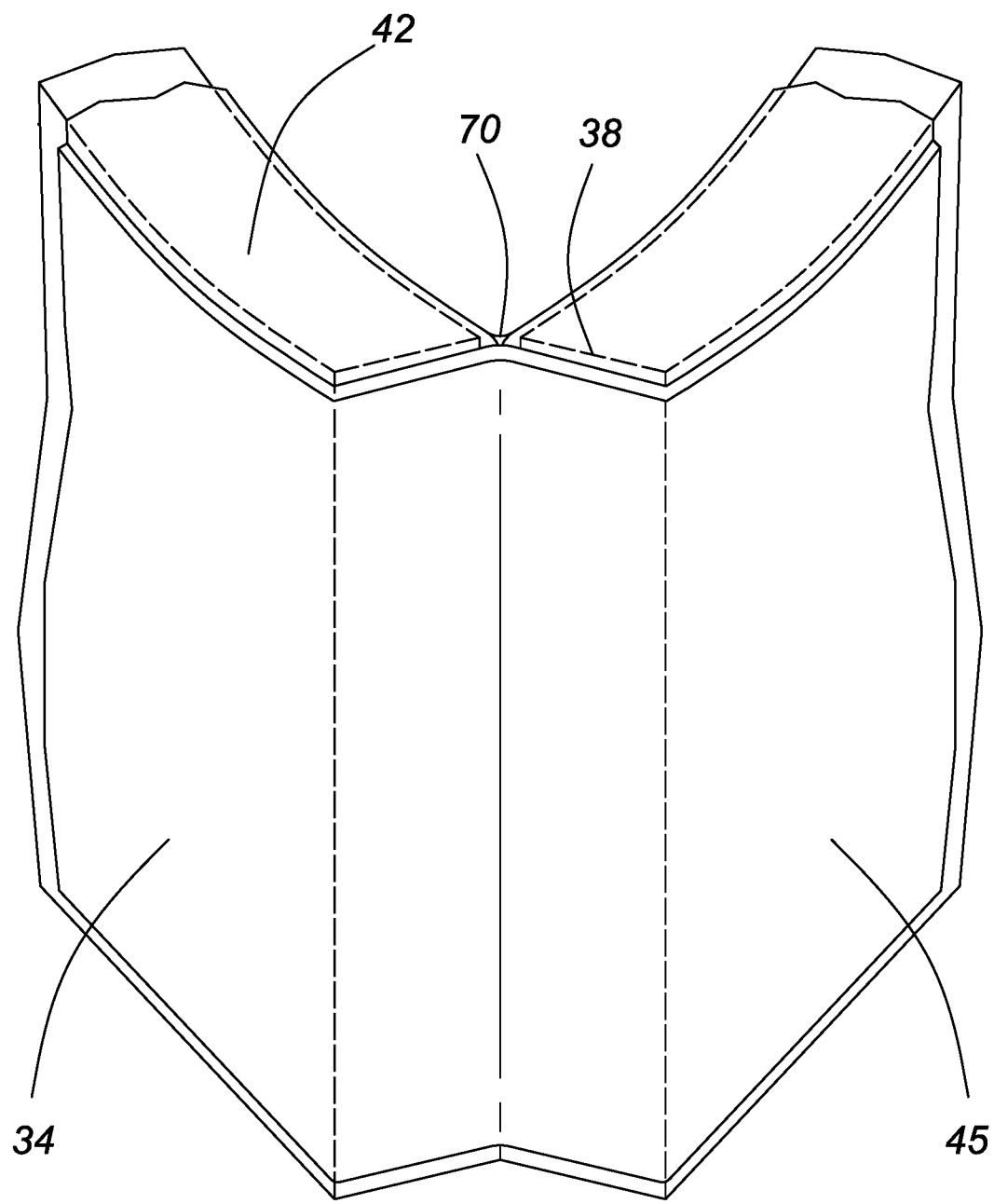
FIG. 11A is the same view as shown in FIG. 11, with the back sheets of material attached to the rear and edge surfaces of the panels.

One method of attaching the top sheet 40 to the body member 20 and holding the top sheet 40 in place overlaying the front surfaces 32 of the panels 30 is to use edge strips 42 as shown in FIG. 10 and in the isolated views of a fold zone in FIGS. 11 and 11A. Edge strips 42 may be made of the same soft flexible material used for the top sheet 40. Separate edge strips 42 are prepared for each panel 30. The edge strips 42 are cut wider than the thickness of the edges surfaces 36 of the panels 30, leaving sufficient material to be wrapped around and attached to the back surface 34 of the panels 30 using staples, glue or other means. The edge strips 42 are attached to the bottom, sides and top of the top sheet 40, by sewing or other means, such as gluing. At the panel boundaries 38 between the panels 30, the edge strips 42 are cut short and the ends are stitched together at the top and bottom as shown in FIG. 11, leaving sufficient material to permit the panels 30 to be folded between the open and closed positions. As shown in FIG. 11A, back sheets 45 of soft flexible material may be applied to the back surfaces 34 of the panels 30 and to the panel edge surfaces 36 at panel boundaries 38 to give the rear surface 24 of the body member 20 a clean, finished look by covering up any staples, stitching or glue. Holes are cut in the back sheets 45 to provide access to the threaded insets 29, 59.

Other methods may be used to attach top sheet 40 to body member 20. For example, top sheet 40 may be cut lager than the combined top surfaces 32 of the panels 30, with the excess used to wrap around the edge surfaces 36 of the panels 30 and attached to the back surfaces 34 thereof using staples, nails, glue, or the like.

In use of the multi-piece foldable headboard 10, the foldable body member 20 is unfolded from its collapsed state, as shown in FIG. 3, into its fully expanded state, as shown in FIG. 5 by moving panels 30 apart so that the front surfaces 32 are moved from being in parallel opposition to being co-planer. In the fully open position shown in FIG. 5, a portion of the edge surface 36 of each panel 30 is located adjacent and opposing at least a portion of the edge surface 36 of at least one neighbouring panel 30 at the panel boundary 38. Latch piece 28 is positioned across the panel boundary 38 and attached to the back surface 34 of the adjacent panels 30 to hold the panels locked in the fully open, expanded state. Posts 50 are attached to the body member 20 (see FIG. 1), which may then be connected to the bed frame.

In the fully expanded and locked state top sheet 40 is stretched tightly across the front surface 22 of foldable body member 20 giving the headboard 10 the appearance of a solid headboard, as shown in FIGS. 1 and 7, with no visible fold lines or creases.

To collapse the multi-piece foldable headboard 10 for storage or transport, the posts 50 are removed from the bed frame and detached from the foldable body member 20. Latch piece 28 is removed from the panels 30, and the panels 30 are folded at the boundaries 38, returning the foldable body member 20 to its collapsed state, as shown in FIG. 3, where the front surfaces 32 of panels 30 are in parallel opposition. The foldable headboard 10 can now be conveniently shipped or stored in a highly compact arrangement.

The embodiments described herein are intended to be illustrative of the present apparatus and methods and are not intended to limit the scope of the present multi-piece foldable headboard and method of making a multi-piece foldable headboard. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

The invention claimed is:

1. A foldable headboard for connection to a bed frame comprising:
  a body member comprising a plurality of panels, each panel having a front surface and a rear surface;
  a sheet of a soft flexible material connected to the body member and overlaying the front surfaces of the panels, the soft flexible material forming a connecting hinge between adjacent panels permitting the body member to be folded between a fully open position where the front surfaces of the panels are co-planar and a fully closed position where the front surfaces of the adjacent panels are in parallel opposition;
  a latching mechanism attachable to rear surfaces of the panels for locking the body member in the fully open position; and
  posts attachable to the body member, the posts configured for securing the body member to the bed frame.

2. The foldable headboard of claim 1, wherein the plurality of panels is two panels.

3. The foldable headboard of claim 1, wherein the plurality of panels is three panels.

4. The foldable headboard of claim 1, wherein each of the plurality of panels comprises a rigid back sheet and a layer of resilient padding attached to the back sheet.

5. The foldable headboard of claim 1, further including at least one edge strip of soft flexible material attached to the sheet and to the rear surfaces of the plurality of panels, the at least one edge strip securing the sheet in place overlaying the front surfaces of the plurality of panels.

6. The foldable headboard of claim 1, further including a back sheet of soft flexible material attached to the rear surfaces of the plurality of panels.

7. The foldable headboard of claim 1, wherein each panel has an edge surface connecting the front and rear surfaces of the panel.

8. The foldable headboard of claim 1, wherein the sheet has a size and shape equal to a combined size and shape of the front surfaces of the plurality of panels when the body member is in the fully open position.

9. A foldable headboard for connection to a bed frame comprising:
  a body member being foldable between a fully open position and a fully closed position, the body member comprising a plurality of panels, each panel having opposed front and rear surfaces and an edge surface connecting the front and rear surfaces the panel, wherein at least a portion the edge surface of each panel is positioned adjacent and abutting a portion of the edge surface of at least one of an adjacent one of the plurality of panels when the body member is in the fully open position;
  a top sheet of a soft flexible material having a size and shape equal to a combined size and shape of the front surfaces of the plurality of panels when the body member is in the fully open position, the top sheet overlaying the front surfaces of the plurality of panels and being affixed to the body member thereby forming a soft flexible connecting member at a boundary between the adjacent and abutting edge surfaces of the panels, the soft flexible connecting member forming a connecting hinge permitting the body member to be folded at the boundary between the fully open position and the fully closed position wherein the front surfaces of the adjacent ones of the plurality of panels are in parallel opposition;
  a latching mechanism attachable to the rear surfaces of the panels for locking the body member in the fully open position; and
  posts attachable to the body member, the posts configured for securing the body member to the bed frame.

10. The foldable headboard of claim 9, wherein the plurality of panels is two panels.

11. The foldable headboard of claim 9, wherein the plurality of panels is three panels.

12. The foldable headboard of claim 9, wherein each of the plurality of panels comprises a rigid back sheet and a layer of resilient padding attached to the back sheet.

13. The foldable headboard of claim 9, further including at least one edge strip of soft flexible material attached to the top sheet and to the rear surfaces of the plurality of panels, the at least one edge strip securing the top sheet in place overlaying the front surfaces of the plurality of panels.

14. The foldable headboard of claim 9, further including a back sheet of soft flexible material attached to the rear surfaces of the plurality of panels.

15. A method of making a foldable headboard for attachment to a bed frame, the method comprising:

assembling a body member in a fully open position, the body member comprising a plurality of panels, each panel having a front surface and a rear surface;

overlaying the front surfaces of the panels with a top sheet of a soft flexible material;

attaching the top sheet to the body member so that the soft flexible material forms a connecting hinge between adjacent ones of the plurality of panels thereby permitting the body member to be folded between the fully open position where the front surfaces of the plurality of panels are co-planar and a fully closed position where the front surfaces of the adjacent ones of the plurality of panels are in parallel opposition;

providing a latching mechanism for attachment to the rear surfaces of the panels for locking the body member in the fully open position; and providing posts for attachment to the body member, the posts configured for securing the body member to the bed frame.

16. The method of claim 15, wherein the plurality of panels is two panels.

17. The method of claim 15, wherein the plurality of panels is three panels.

18. The method of claim 15, wherein each of the plurality of panels comprises a rigid back sheet and a layer of resilient padding attached to the back sheet.

19. The method of claim 15, wherein attaching the top sheet to the body member includes attaching at least one edge strip of soft flexible material to the top sheet and to the rear surfaces of the plurality of panels to secure the top sheet in place overlaying the front surfaces of the plurality of panels.

20. The method of claim 15, further including attaching a back sheet of soft flexible material to the rear surfaces of the plurality of panels.

21. The method of claim 15, wherein each of the plurality of panels has an edge surface connecting the front and rear surfaces of the panel.

22. The method of claim 15, wherein the top sheet has a size and shape equal to a combined size and shape of the front surfaces of the plurality of panels when the body member is in the fully open position.

\* \* \* \* \*